Patented Jan. 9, 1951

2,537,873

UNITED STATES PATENT OFFICE 2,537,873

PROCESS OF MANUFACTURING 4,5-DIPHENYL PHTHALIC ANHYDRIDES

Charles F. H. Allen and James A. Van Allan, Rochester, N. Y., assignors to Eastman Kodak Company, Rochester, N. Y., a corporation of New Jersey No Drawing. Application March 10, 1948, Serial No. 14,158

3 Claims. (Cl. 260—342.4)

This invention relates to the manufacture of 4,5-diphenyl phthalic anhydrides, and more particularly to their manufacture from anhydroacetone benzils.

It has been known to prepare tetraphenyl phthalic anhydride from tetraphenylcyclopentadienone and maleic anhydride, either by boiling in nitrobenzene (Dilthey, Thewalt and Trösken, Ber. 67B, 1959–64 (1934)), or by melting together at 190–200° C. (Dilthey, U. S. Patent 2,097,854). It has also been known to prepare tetraphenyl phthalic anhydride by refluxing tetraphenyl cyclopentadienone and chloromaleic anhydride in bromobenzene (Synerholm, J. Am. Chem. Soc. 67, 1229–30 (1945)).

However, the preparation of 4,5-diphenyl phthalic anhydrides,

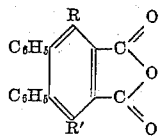

in which R and R' are not phenyl, but alkyl or hydrogen, has been more difficult. The corresponding cyclopentadienones

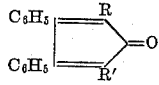

cannot be isolated in the monomeric state (Chem. Revs. 37, 216 (1945)). When the corresponding cyclopentenol-ones (anhydroacetonebenzils) are dehydrated, dimeric endocarbonyl products are formed which do not condense with maleic anhydride.

If, on the other hand, the anhydroacetone benzil itself is boiled with maleic anhydride in nitrobenzene, according to Dilthey's procedure, no reaction takes place. If sulfuric acid is added to the reaction mixture and the solution is boiled, the dimeric endocarbonyl product mentioned above is formed. If anhydroacetonebenzil and an excess of maleic anhydride are used, the product is a dianhydride

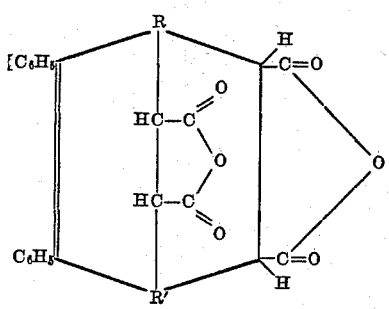

Two additional operations are required to effect conversion of this compound to the substituted phthalic acid. The overall yield is quite low.

We have discovered that if an anhydroacetone benzil selected from the group consisting of anhydroacetone benzil and the lower α-alkyl anhydroacetone benzils is heated with chloromaleic anhydride and a catalytic amount of a dehydrating mineral acid, such, for instance, as sulfuric acid, a 4,5-diphenyl phthalic anhydride is formed. Our theory of the mechanism of the reaction is that the anhydroacetone benzil is momentarily dehydrated to a 3,4-diphenyl cyclopentadienone, and that the nascent diphenyl cyclopentadienone immediately reacts with the chloromaleic anhydride to form a 4,5-diphenyl phthalic anhydride, neither dimerization of the 3,4-diphenyl cyclopentadienone nor double addition of the chloromaleic anhydride taking place.

The reaction may be carried out in the presence or absence of a solvent, or with excess chloromaleic anhydride as a solvent.

By way of illustrating our invention, we give the following examples.

*Example I.—3-methyl-4,5-diphenyl phthalic anhydride.*—A mixture of 5.28 parts by weight of α-methyl anhydroacetonebenzil, 3 parts of chloromaleic anhydride and a trace of concentrated sulfuric acid in 10 parts of bromobenzene was refluxed for 7 hours and then allowed to stand at room temperature for several days. Crystals formed, which were filtered and washed with methanol. The first crop, 2.9 parts, had a melting point of 192–194° C. When the wash methanol was added to the filtrate, another 0.8 part with the same melting point separated. The total yield of 3-methyl-4,5-diphenyl phthalic anhydride was 3.7 parts (59%). The compound may be recrystallized from acetic acid. The reaction may be represented as follows:

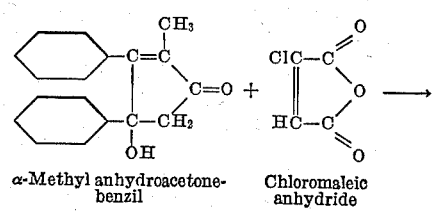

α-Methyl anhydroacetone-benzil    Chloromaleic anhydride

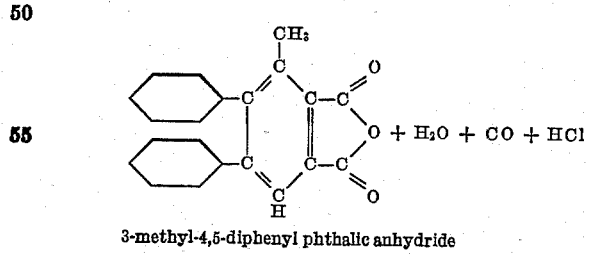

3-methyl-4,5-diphenyl phthalic anhydride 3-methyl-4,5-diphenyl phthalic anhydride has previously been described by the applicants in J. Org. Chem. 10, 337 and 339 (1945).

*Example II.—4,5-diphenylphthalic anhydride.*— A mixture of three parts by weight of anhydroacetonebenzil, 4 parts of chloromaleic anhydride and 1 drop of concentrated sulfuric acid was heated at 200° C. for one hour. The product was then distilled, and the distillate taken up in benzene, treated with Norit decolorizing carbon, and an equal volume of ligroin (B. P. 90–120° C.) added. On chilling, 1.8 parts of the pure 4,5-diphenyl phthalic anhydride separated; M. P. 99–100° C. The yield was 50%. 4,5-diphenyl phthalic anhydride,

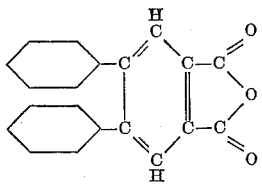

has previously been described by Allen, Eliot and Bell in Can. J. Research B17, 78 and 86 (1939), where it is called 3,4-diphenyl phthalic anhydride. It might also be designated as o-terphenyl 4',5'-dicarboxylic anhydride.

The diphenyl phthalic anhydrides are useful intermediates in the preparation of dyes.

What we claim as our invention and desire to be secured by Letters Patent of the United States is:

1. A process of manufacturing a 4,5-diphenyl phthalic anhydride, which comprises heating an anhydroacetone benzil selected from the group consisting of anhydroacetone benzil and the lower α-alkyl anhydroacetone benzils with chloromaleic anhydride and a catalytic amount of a dehydrating mineral acid.

2. A process of manufacturing 3-methyl-4,5-diphenyl phthalic anhydride, which comprises heating α-methyl anhydroacetonebenzil with chloromaleic anhydride and a catalytic amount of concentrated sulfuric acid.

3. A process of manufacturing 4,5-diphenyl phthalic anhydride, which comprises heating anhydroacetonebenzil with chloromaleic anhydride and a catalytic amount of concentrated sulfuric acid.

CHARLES F. H. ALLEN.
JAMES A. VAN ALLAN.

REFERENCES CITED

The following references are of record in the file of this patent:

UNITED STATES PATENTS

| Number | Name | Date |
| --- | --- | --- |
| 2,097,854 | Dilthey | Nov. 2, 1937 |